United States Patent [19]
Demarest et al.

[11] Patent Number: 5,234,140
[45] Date of Patent: Aug. 10, 1993

[54] RE-USEABLE AEROSOL CONTAINER

[75] Inventors: Scott W. Demarest, Caledonia; John D. Hagarty, Racine; Henry H. Lee, Wind Point; Jane A. Chase, Franklin, all of Wis.

[73] Assignee: S. C. Johnson & Son, Inc., Racine, Wis.

[21] Appl. No.: 920,720

[22] Filed: Jul. 28, 1992

[51] Int. Cl.⁵ .............................................. B65D 83/14
[52] U.S. Cl. ..................................... 222/394; 222/399
[58] Field of Search ........................ 222/389, 394, 399; 239/373

[56]  References Cited
U.S. PATENT DOCUMENTS

| | | | |
|---|---|---|---|
| 2,351,376 | 6/1944 | Ward | 222/399 |
| 2,691,548 | 10/1954 | Feuch et al. | 239/373 |
| 2,954,678 | 10/1960 | Mahon et al. | 222/399 |
| 3,053,422 | 9/1962 | Tenison et al. | 222/399 |
| 3,528,921 | 9/1970 | Gray | 252/99 |
| 3,964,649 | 6/1976 | Alexander | 222/399 |
| 4,513,884 | 4/1985 | Magid | 222/94 |
| 4,553,685 | 11/1985 | Magid | 222/1 |
| 4,679,706 | 7/1987 | Magid et al. | 222/399 |
| 5,009,340 | 4/1991 | Morane | 222/94 |

FOREIGN PATENT DOCUMENTS

| | | |
|---|---|---|
| 510555 | 3/1955 | Canada. |
| 679801 | 4/1930 | France .............................. 222/399 |
| 2090603A | 7/1982 | United Kingdom. |

OTHER PUBLICATIONS

Pp. 14-15 of The Way Things Work, An Illustrated Encyclopedia Of Technology, Simon and Schuster, New York, 1967, which relates to the topic of "Fire Extinguishers".

Primary Examiner—Andres Kashnikow
Assistant Examiner—Philippe Deighshani

[57] ABSTRACT

A re-useable aerosol container is disclosed. Such an aerosol container defines an aperture and an inner chamber for containing a fluid. The aerosol container includes an aerosol valve for dispensing fluid contained within the aerosol container. The aerosol container further defines a neck surrounding the aperture and further includes a plug defining a cavity that is removably insertable into the inner chamber via the aperture. The plug includes a collar surrounding its cavity. The plug collar and the aerosol container neck are so relatively dimensioned and adapted as to be removably engageable in a fluid-tight manner when the plug cavity is inserted into the aerosol container inner chamber via the aerosol container aperture. The aerosol container further includes dry chemical formulation ingredients, disposed within the plug cavity. Such dry chemical ingredients, when mixed with water, are able to produce gas, for purposes of pressurizing the fluid container chamber. The aerosol container still further includes a water-soluble membrane, removably affixed atop the plug cavity, for retaining the dry chemical ingredients within the plug cavity.

6 Claims, 6 Drawing Sheets

RE-USEABLE AEROSOL CONTAINER

TECHNICAL FIELD

Our invention, in general, is directed to a novel, re-useable aerosol container.

BACKGROUND ART

U.S. Pats. Nos. 4,513,884 and 4,553,685, both to Magid, are presently believed to be illustrative of current re-useable aerosol container technology.

Upon our review of this particular technology, however, in view of certain consumer requests, we have come to learn that many consumers are presently seeking re-useable aerosol containers that are simpler in design as well as simpler in operation and lower in cost than what is presently available to them in the marketplace.

SUMMARY DISCLOSURE OF INVENTION

The present invention is directed to an improvement in a re-useable aerosol container. Such an aerosol container defines an aperture and an inner chamber for containing a fluid. The aerosol container further includes an aerosol valve for dispensing fluid contained within the aerosol container.

The improvement in the re-useable aerosol container of the present invention can be summarized as follows.

Our improved aerosol container, in addition to the various elements recited above, further includes a neck surrounding the aerosol container aperture. Our improved aerosol container additionally includes a plug defining at least one cavity that is removably insertable into the aperture.

The plug includes a collar surrounding the plug cavity. The plug collar and the aerosol container neck are so relatively dimensioned and adapted as to be removably engageable in a fluid-tight manner when the plug cavity is inserted into the aerosol container inner chamber via the aerosol container aperture.

The improved aerosol container further includes dry chemical formulation ingredients, disposed within the plug cavity. Such dry chemical ingredients, when mixed with water, are able to produce gas, for purposes of pressurizing the fluid container chamber. Our improved aerosol container still further includes a water-soluble membrane, affixed atop the plug cavity, for retaining the dry chemical ingredients within the plug cavity.

These and other aspects and features of our present invention are discussed below in detail.

INDUSTRIAL APPLICABILITY

Those skilled in the art know of various dry chemical ingredients that are able to produce gas upon being combined with water.

When the dry chemical formulation ingredients include sodium bicarbonate and citric acid, the novel, improved, re-useable aerosol container of our present invention can be used for the in situ generation of carbon dioxide ($CO_2$).

Furthermore, when the aerosol container of the present invention is utilized for such in situ generation of $CO_2$, various additional dry dispersible ingredients, such as various insect repellants, various insecticidal actives, various bathroom cleaners, as well as various other dry formulations (preferably of relatively fine particle size) can be combined with the dry chemical (gas producing) formulation ingredients, disposed into the above-mentioned plug cavity and, thereafter, dispersed as an aerosol via the in situ generated $CO_2$ within the fluid container chamber.

BRIEF DESCRIPTION OF THE DRAWINGS

Throughout the drawing figures, like reference numerals refer to like parts.

BEST MODE FOR CARRYING OUT THE INVENTION

While our invention will now be described with reference to the accompanying illustrated preferred embodiments, it is to be understood that the scope of our invention is not to be limited thereto.

On the contrary, as those skilled in the art can well appreciate, the scope of our invention is to be understood to cover all structural as well as all functional alternatives and equivalents, as are defined by the appended claims.

Referring to FIGS. 1-5, the first embodiment of our present invention will now be described. The first embodiment of our re-useable aerosol container 100 comprises a reservoir 102 defining an inner chamber 104. (See, e.g., FIGS. 2 and 4.) An aerosol valve 106, conventional in nature and design and well-known to those skilled in the art, is secured, such as by crimping, to one end of reservoir 102.

The aerosol valve 106 includes a dispensing nipple 108 (FIG. 2), a dip tube 110, and a mount 112 for securing the dispensing nipple 108 and dip tube 110 together in fluid communication.

Figure 2:
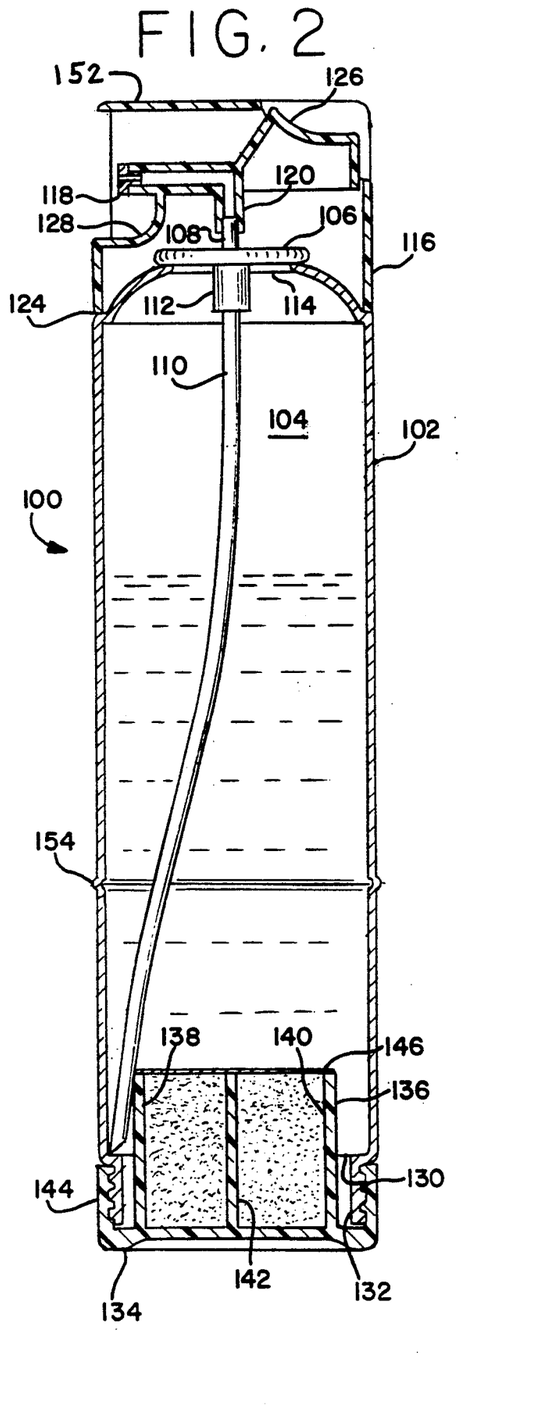
FIG. 2 is an elevational view, in section, along the plane 2—2 in FIG. 1.
Figure 4:
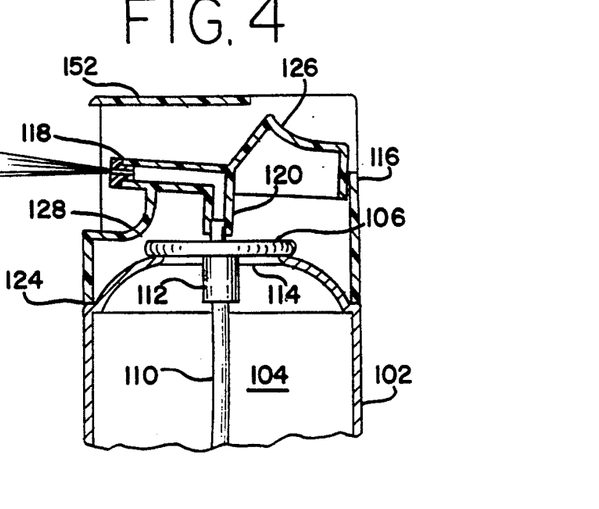
FIG. 4 is a fragmented sectional view of the upper portion of the aerosol container of the embodiment of FIGS. 1-3, FIG. 2 showing a conventional aerosol valve in a "normally closed" position and FIG. 4 showing the aerosol valve in a "normally open" position.

It is desirable that an upper end of the reservoir 102 define an aperture 114, dimensioned to receive the mount 112 enable the aerosol valve 106 to be attached, as by crimping, to the reservoir 102 atop the aperture 114, as is shown in FIGS. 2 and 4.

Also mounted atop the reservoir 102, and in fluid communication with the aerosol valve 106, is a spray head 116, shown in FIGS. 1-4. The illustrated spray head 116 is preferably of one-piece plastic construction.

A spray nozzle 118, is mounted within the spray head 116.

The spray head 116 includes an L-shaped sleeve 120 having the spray nozzle 118 disposed in one end and the dispensing nipple 108 disposed in the other end. The sleeve 120 is so dimensioned and configured as to snugly receive both the dispensing nipple 108 and the spray nozzle 118 and to provide fluid communication between the dispensing nipple 108 and the spray nozzle 118.

Preferably the reservoir 102 includes an upper ledge 122 (FIG. 3) and the spray head 116 includes a shoulder 124 that sits atop the upper ledge 122 when the sleeve 120 has the dispensing nipple 108 thus contained therein. (See FIGS. 3 and 4.)

The spray head 116 further defines a unitary valve actuator 126 as well as a unitary hinge 128. In particular, the valve actuator 126 is unitary with the hinge 128 via the sleeve 120. Depression of the valve actuator 126 (please compare FIGS. 2 and 4) thus causes the sleeve 120 to depress the dispensing nipple 108. Such action upon nipple 108, in turn, enables spraying to occur from nozzle 118 when the inner chamber 104 of the reservoir 102 is pressurized.

The above discussion, relating to the upper aperture 114 (FIGS. 2 and 4), concerns that end of the reservoir 102 which includes the aerosol valve 106.

Figure 3:
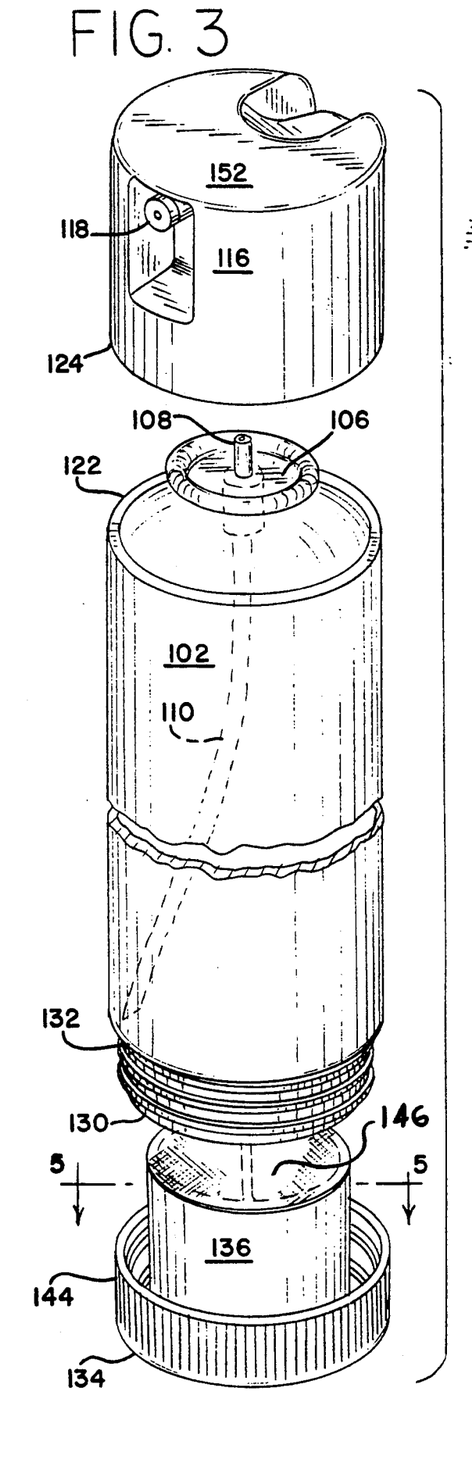
FIG. 3 is an exploded perspective view, partially fragmented, of the embodiment shown in FIG. 1.

The illustrated reservoir 102 includes yet another aperture 130, preferably spaced at the opposite end of the reservoir 102 relative to the aerosol valve 106, as is shown in FIG. 3; and the reservoir 102 further defines a neck 132 surrounding such an aperture 130.

Figure 5:
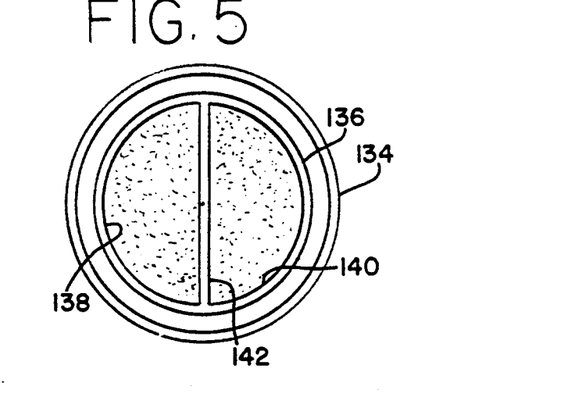
FIG. 5 is a sectional view of the plug shown in FIG. 3, taken from the plane 5—5 of FIG. 3.

Our novel, re-useable aerosol container 100 further includes a plug 134. In the embodiment of the plug 134 that is shown in FIGS. 2, 3, 5 and 12, such a plug 134 includes a hollow insert 136 which defines two cavities 138 and 140, into which a dry formulation can be disposed, as is shown in FIGS. 2 and 5. For example, a dry insecticidally-active formulation can be disposed in cavity 138 and a dry chemical (gas producing) formulation of sodium bicarbonate and citric acid can be disposed in cavity 140.

In the embodiment of the plug 134 that is shown in FIGS. 2 and 5, a unitary wall 142 is included for purposes of separating the cavities 138 and 140.

The plug 134 further includes a collar 144 surrounding the hollow insert 136. The plug collar 144 and the aerosol container neck 132 are so relatively dimensioned and adapted as to be removably engageable in a fluid-tight manner when the plug insert 136 is inserted into the aerosol container inner chamber 104 via the aerosol container aperture 130.

Figure 1:
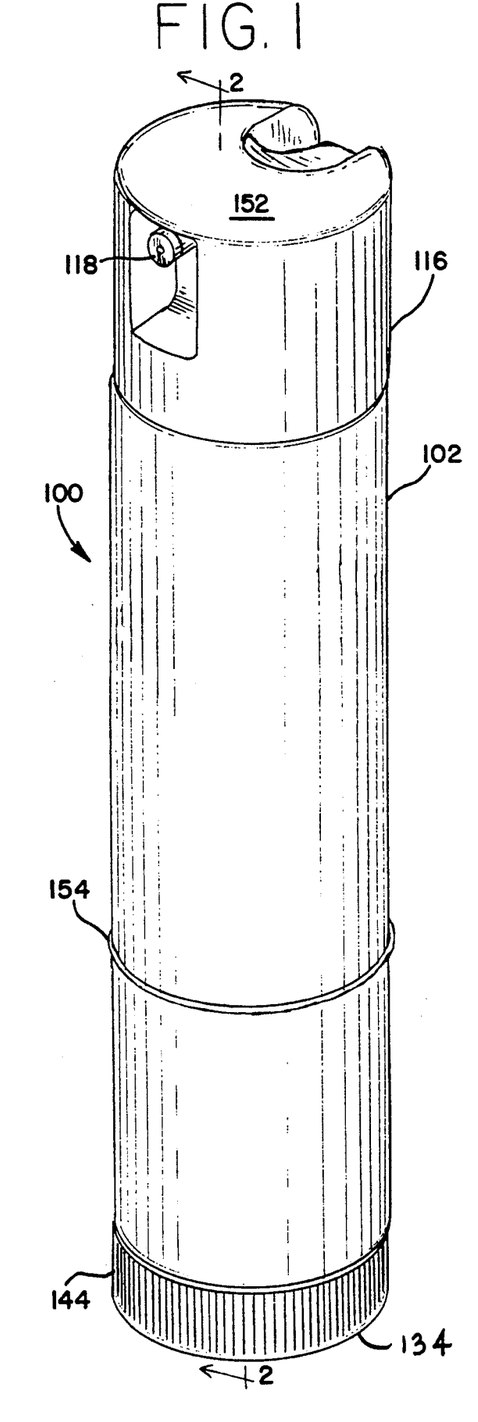
FIG. 1 is a perspective view of one embodiment of our present invention.

For example, the reservoir 102 and plug 134 can be held together in a fluid-tight manner utilizing mating threads as is shown in FIGS. 2 and 3, or can be removably secured together by a bayonet-type mounting, or any other suitable fluid-tight mounting, well known in the art. If desired, an external peripheral portion of the collar may be knurled (to provide a frictional surface), as is shown in FIGS. 1, 3 and 12.

Figure 12:
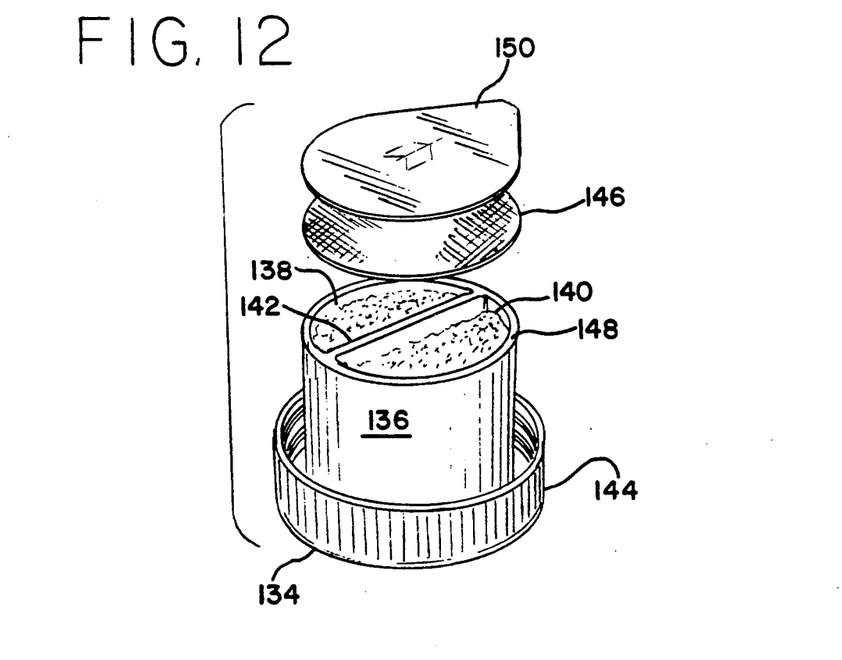
FIG. 12 is an exploded perspective view of that plug embodiment shown in FIGS. 1-3 and 5.

The reader's attention is next directed to FIG. 12.

We prefer to keep the dry ingredients within the cavities 138 and 140 fresh and dry by securing a water-soluble membrane 146, such as polyvinyl alcohol, to an upper lip 148 of the inset 136. (Such dry ingredients may be in powdered form, in tablet form, and so forth, as is desired.)

We further prefer to secure a piece of removable foil 150 atop the water-soluble membrane 146, the foil 150 being secured to that peripheral portion of the water-soluble membrane 146 which is on the opposite side of the lip 148.

Figure 6:
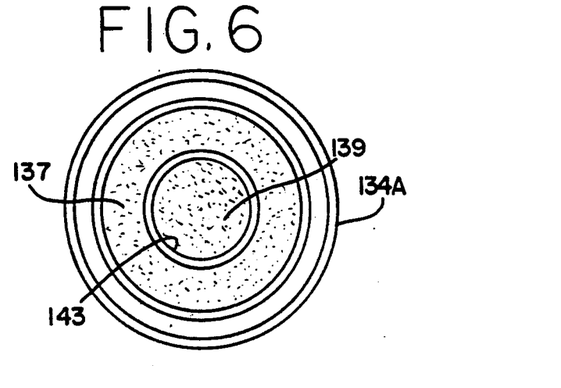
FIG. 6 is a top plan view of another embodiment of such a plug.
Figure 7:
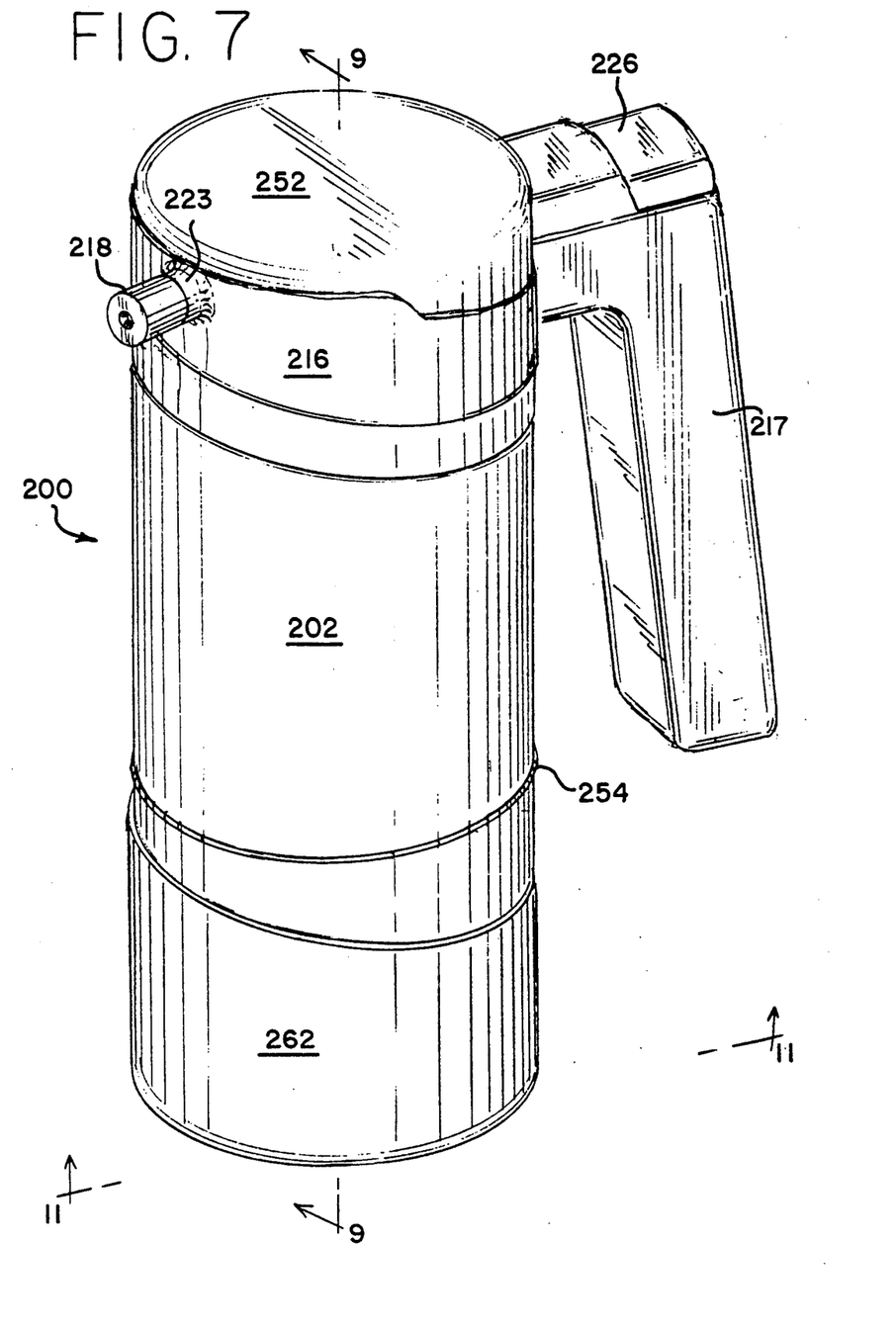
FIG. 7 is a perspective view of another embodiment of the aerosol container of the present invention.

Thus, and in accordance with certain principles of our present invention, a modified version of our plug 134A could readily be manufactured so as to include concentric cavities 137 and 139, separated by an annular wall 143, for purposes of separating the gas-producing dry formulation ingredients disposed in cavity 137 from the dispersible dry formulation ingredients disposed in cavity 139, if such is desired, as is shown in FIG. 6.

Our illustrated spray head 116 is further provided with a level upper surface 152 (FIGS. 1 and 3), and our illustrated fluid reservoir 102 is provided with a circumferential bead 154, as is shown in FIGS. 1 and 2.

To fill the re-useable aerosol container of the present invention, the reservoir 102 is inverted, with the relatively flat "upper" surface 152 of the spray head 116 resting on a table, a countertop, a sink, or other suitable surface.

Next, water is introduced into the inner chamber 104 up to the fill line, identified by the bead 154. Then, taking a fresh plug 134, and after removing the foil 150 from the water-soluble membrane 146, the insert 136 is introduced into the inner chamber 104 via the aperture 130, and the reservoir neck 132 and plug collar 144 removably joined together in a fluid-tight manner as described above.

When the reservoir 102 is thus inverted, after plug 134 is thus secured to the reservoir neck 132, the water-soluble member 146 does not come in contact with the water within the inner chamber 104. This is because the water-soluble membrane 146, which is on plug 134 while plug 134 is secured to the reservoir 102 when in its "inverted" position, does not come in contact with water, when the reservoir 102 is filled with a fluid such as water, up to the bead line 154, as described above.

Indeed, the design of our aerosol container 100 is such that water within inner chamber 104 does not come into contact with plug 134 until after the aerosol container 100 is "righted" from its above-described inverted position. As soon as the water dissolves membrane 146 and comes in contact with the gas-producing dry formulation ingredients within the plug cavity (or cavities), the pressurization of the inner chamber 104 takes place in a well-known manner, thus eliminating misuse and/or loss of gas (propellant).

Reference is next invited to FIGS. 7-11, for purposes of discussing a second embodiment of the aerosol container of the present invention. The second embodiment of our aerosol container 200 similarly includes a reservoir 202 defining an inner chamber 204. Another conventional aerosol valve 206 is secured to an upper portion of reservoir 202, in the manner described above. The illustrated conventional valve 206 similarly includes a dispensing nipple 208.

Of course, a wide variety of other types of valves, and valving systems, could readily be utilized, in accordance with certain principles of our present invention.

Figure 9:
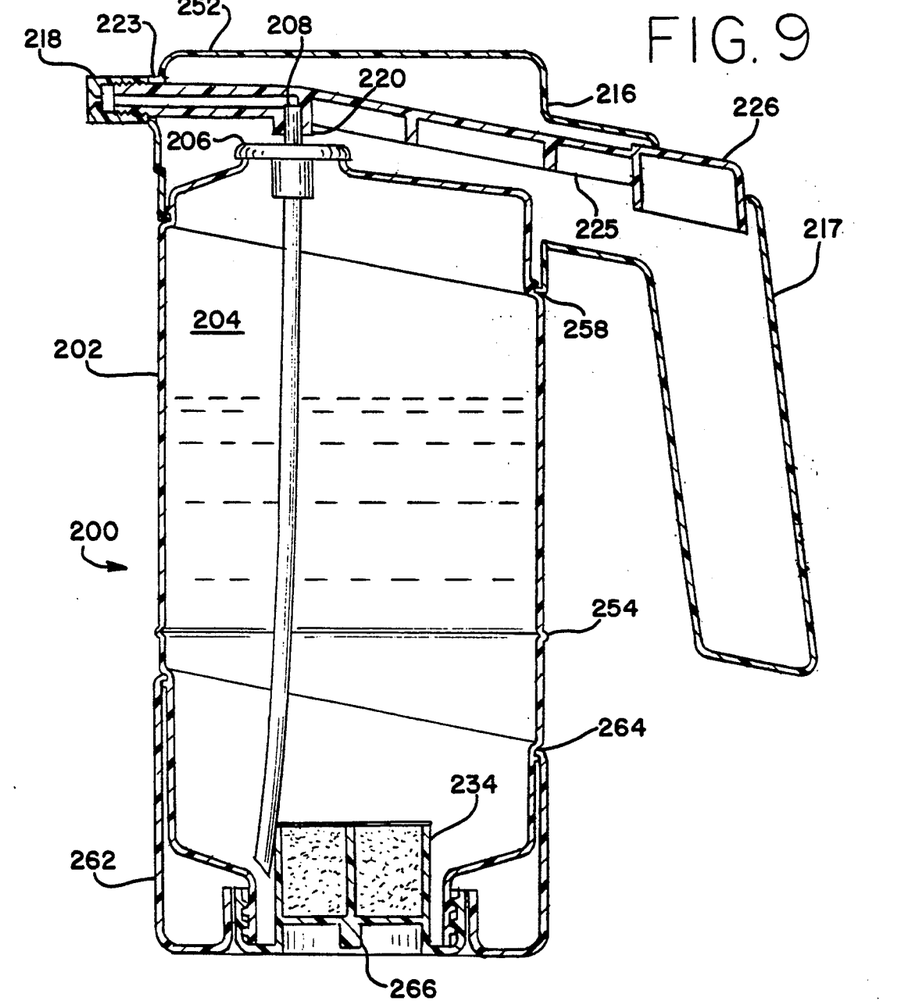
FIG. 9 is a side elevational view, in section, of that aerosol container embodiment shown in FIG. 7, taken from the plane 9—9 in FIG. 7.
Figure 10:
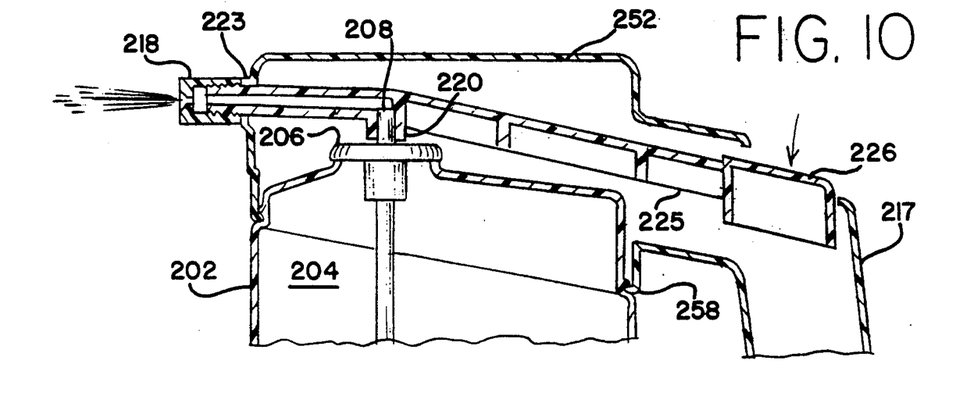
FIG. 10 is a fragmented sectional view, of the upper portion of that aerosol container embodiment shown in FIGS. 7-9, FIG. 9 showing the above-mentioned conventional aerosol valve in a "normally closed" position and FIG. 10 showing the aerosol valve in a "normally open" position.

A second embodiment of the spray head 216 includes a unitary handle 217 as well as a spray nozzle 218 spaced from the handle 217, as is shown in FIGS. 9 and 10. The spray head 216 further includes an L-shaped sleeve 220 adapted and dimensioned to receive the dispensing nipple 208 of the aerosol valve 206, as discussed above and as shown in FIGS. 9 and 10.

The sleeve 220, which provides fluid communication between the dispensing nipple 208 and the spray nozzle 218, further provides a hinged connection for purposes of causing the dispensing nipple 208 to be depressed, in the manner discussed above. In particular, a valve actuator 226 is unitary with the sleeve 220 via integral arm 225. The L-shaped sleeve 220, the arm 225 and the valve actuator 226, are all provided by a single piece of resilient plastic.

Figure 11:
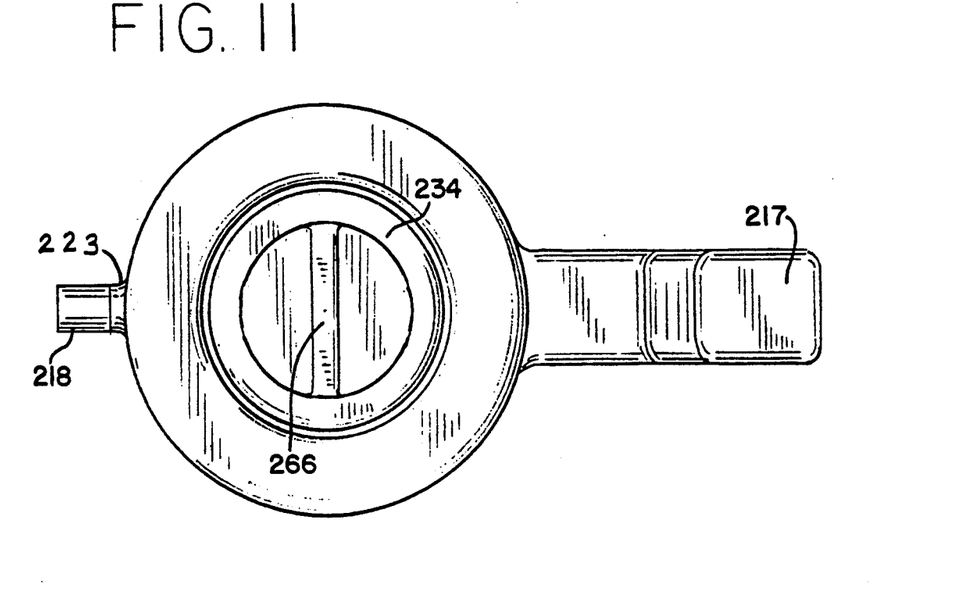
FIG. 11 is a bottom plan view of the aerosol container embodiment of FIG. 7, taken from the plane 11—11 in FIG. 7.

The illustrated spray head 216 of FIGS. 9-11 further includes a shouldered opening 223 in which an end portion of the L-shaped sleeve 220 (opposite the dispensing nipple 208) is snugly retained. The thus-retained end portion of the sleeve 220 distends slightly through the shouldered opening 23, as is shown in FIG. 9. Such distended end of the sleeve 220 includes external threads, and the spray nozzle 218 includes mated, internal threads, for securing the spray nozzle 218 onto the sleeve 220, as is shown in FIGS. 9 and 10. The spray nozzle 218, because of the screw threads between the nozzle 218 and the shouldered opening 223, is able to provide an adjustable spray pattern, by rotating the nozzle 218 relative to the shouldered opening 223.

Depression of the valve actuator 226, as is shown in FIG. 10, causes the sleeve 220 and integral arm 225 to flex in the direction of the dispensing nipple 208. This, in turn, causes the dispensing nipple 208 to be depressed, thus causing an aerosol spray to be dispensed from spray nozzle 218 when the inner chamber 204 of the aerosol container 200 is pressurized.

The illustrated reservoir 202 of the second embodiment is provided with an upper peripheral recess 256 (FIG. 8) and the spray head 216 is provided with a unitary annular ledge 258 (FIG. 9) so dimensioned relative to the peripheral recess 256 as to enable the spray head 216 to be snap-engaged to the reservoir 202 at the peripheral recess 256, as is shown in FIGS. 9 and 10.

Figure 8:
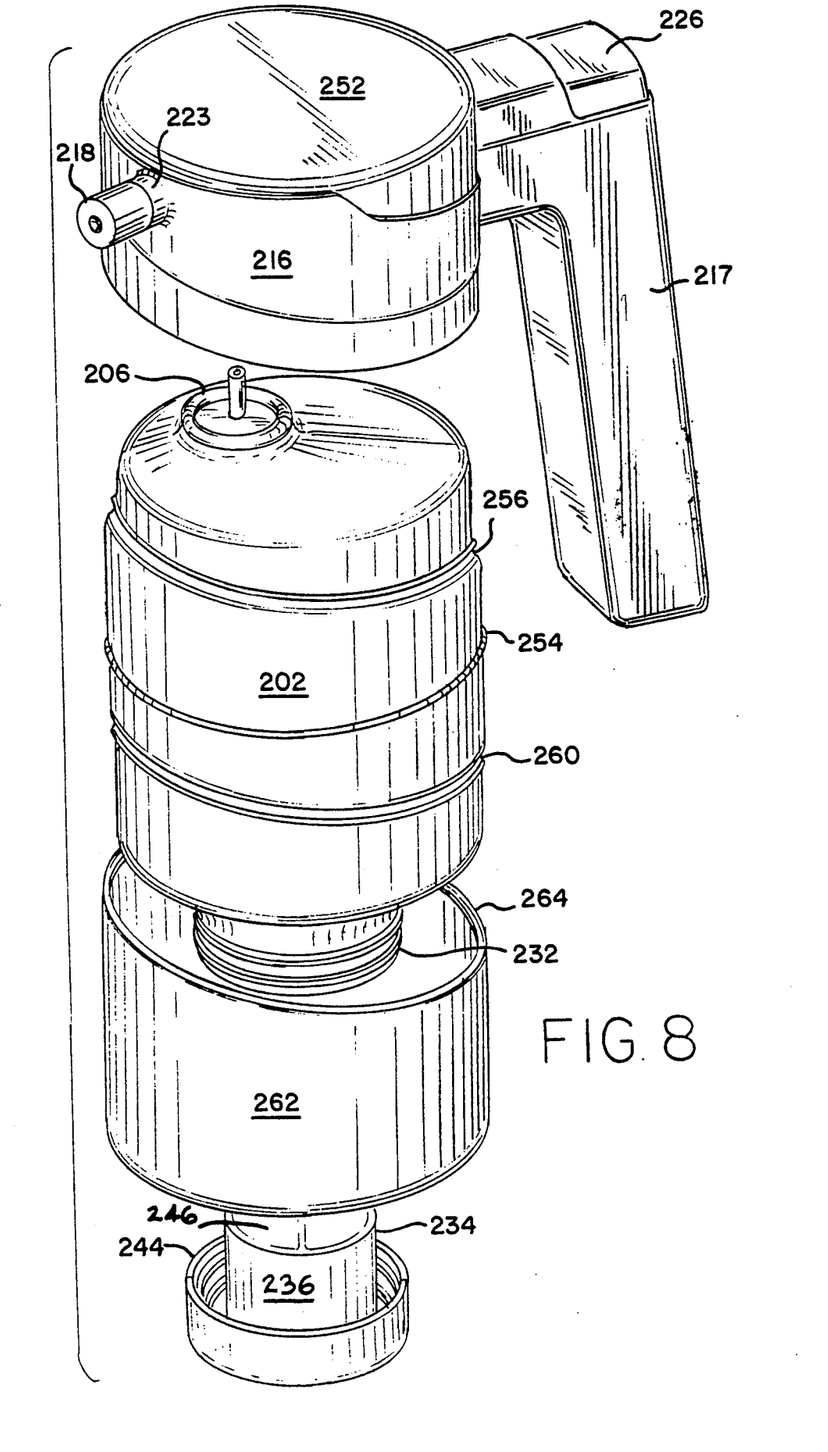
FIG. 8 is an exploded perspective view of that aerosol container embodiment shown in FIG. 7.

The reservoir 202 further includes a second, lower peripheral recess 260. (FIG. 8.) The aerosol container 200, in turn, further includes a base 262 having a unitary annular ledge 264, the annular ledge 264 being so dimensioned relative to the peripheral recess 260 as to enable the reservoir 202 and the base 262 to be snap-engaged together, as is also shown in FIG. 9.

Another plug 234, functionally equivalent to what was described above, is shown in FIGS. 8 and 9. Such plug 234, for example, includes a hollow insert 236 and a collar 244 surrounding the insert 236. The plug 234 of this particular embodiment, however, is provided with an external grip 266 (FIGS. 9 and 11) for enabling the plug 234 to be readily inserted into the bottom aperture of the reservoir 202 (in a fluid-tight manner) and, thereafter, readily removed therefrom.

The illustrated spray head 216 of the second embodiment is similarly provided with a flat upper surface 252, and the reservoir 202 is similarly provided with a circumferential bead 254 which functions as a fill line when the aerosol container 200 is inverted and filled in the manner described above.

What has been illustrated and described herein are two preferred embodiments of a novel, improved aerosol container. Yet while our novel, improved aerosol container has been illustrated and described with reference to these preferred embodiments, it is to be understood that our invention is not to be so limited. On the contrary, various structural and functional equivalents as well as other alternatives, changes and modifications will become apparent to those skilled in the art upon reading the foregoing description. For example, in lieu of citric acid, adipic acid, tartaric acid, succinic acid, as well as various other acids in powdered, tablet, or other solid form could readily be utilized, in accordance with certain principles of the present invention. Depending upon the choice of membrane, moreover, a liquid chemical formulation might be possible, for purposes of generating gas in situ. Accordingly, such equivalents, alternatives, changes and modifications are to be considered as forming a part of our invention insofar as they fall within the spirit and scope of the claims.

We claim:

1. In a container defining an aperture and an inner chamber for containing a fluid, the container including valve means for dispensing fluid contained within the container, wherein the improvement comprises:
   the container further defining a container neck surrounding the container aperture;
   plug means defining two cavities, one of the plug cavities containing the chemical means, the other of the two cavities containing a dispersible formulation, that is removably insertable into the container inner chamber via the container aperture, the plug means including a plug collar surrounding the plug cavity, the plug collar and the container neck being so relatively dimensioned and adapted as to be engageable in a fluid-tight manner when the plug cavity is inserted into the container inner chamber via the container aperture;
   chemical means disposed within the plug cavity and which, when mixed with water, is able to produce gas, for purposes of pressurizing the fluid container chamber; and
   membrane means carried by the plug means for retaining the chemical means within the plug cavity.

2. The container of claim 1 further including foil means carried by the membrane means for preventing liquid water and/or water vapor from contacting the membrane means.

3. In a container defining an aperture and an inner chamber for containing a fluid, the container including valve means for dispensing fluid contained within the container, wherein the improvement comprises:
   the container further defining a container neck surrounding the container aperture;
   plug means defining two cavities, one of the plug cavities containing the chemical means, the other of the two cavities containing a dispersible formulation, that is removably insertable into the container inner chamber via the container aperture, the plug means including a plug collar surrounding the plug cavity, the plug collar and the container neck being so relatively dimensioned and adapted as to be engageable in a fluid-tight manner when the plug cavity is inserted into the container inner chamber via the container aperture;
   chemical means disposed within the plug cavity and which, when mixed with water, is able to produce gas, for purposes of pressurizing the fluid container chamber; and membrane means carried by the plug means for retaining the chemical means within the plug cavity, the chemical means including sodium bicarbonate and citric acid, and the dispersible formulation including an active ingredient.

4. The container of claim 3 further including foil means carried by the membrane means for preventing liquid water and/or water vapor from contacting the membrane means.

5. In a container defining an aperture and an inner chamber for containing a fluid, the container including valve means for dispensing fluid contained within the container, wherein the improvement comprises:

the container further defining a container neck surrounding the container aperture;

plug means defining two cavities, one of the plug cavities containing the chemical means, the other of the two cavities containing a dispersible formulation, that is insertable into the container inner chamber via the container aperture, the plug means including a plug collar surrounding the plug cavity, the plug collar and the container neck being so relatively dimensioned and adapted as to be removably engageable in a fluid-tight manner when the plug cavity is inserted into the container inner chamber via the container aperture;

chemical means disposed with the plug cavity and which, when mixed with water, is able to produce gas, for purposes of pressurizing the fluid container chamber; and membrane means carried by the plug means for retaining the chemical means within the plug cavity, the chemical means including sodium bicarbonate and citric acid, and the dispersible formulation including an insecticidally-active ingredient.

6. The container of claim 5 further including foil means carried by the membrane means for preventing liquid water and/or water vapor from contacting the membrane means.

* * * * *